(12) United States Patent
Zeng

(10) Patent No.: US 8,646,167 B2
(45) Date of Patent: Feb. 11, 2014

(54) METHOD OF ACTUATING A WIRELESS SENSOR OF ROAD CONSTRUCTION EQUIPMENT

(75) Inventor: Jack Zeng, Eden Prairie, MN (US)

(73) Assignee: Sauer-Danfoss Inc., Ames, IA (US)

( * ) Notice: Subject to any disclaimer, the term of this patent is extended or adjusted under 35 U.S.C. 154(b) by 59 days.

(21) Appl. No.: 13/349,296

(22) Filed: Jan. 12, 2012

(65) Prior Publication Data

US 2013/0180100 A1 Jul. 18, 2013

(51) Int. Cl.
*H01S 4/00* (2006.01)
(52) U.S. Cl.
USPC .......... 29/592.1; 29/593; 29/602.1; 700/258; 700/302
(58) Field of Classification Search
USPC .............. 29/592.1, 594, 602.1; 701/200, 258, 701/302
See application file for complete search history.

(56) References Cited

U.S. PATENT DOCUMENTS

| | | | |
|---|---|---|---|
| 5,767,766 A * | 6/1998 | Kwun | 340/436 |
| 6,097,312 A * | 8/2000 | Tanji et al. | 340/905 |
| 6,111,211 A | 8/2000 | Dziedzic et al. | |
| 6,359,570 B1 * | 3/2002 | Adcox et al. | 340/902 |
| 6,975,941 B1 * | 12/2005 | Lau et al. | 701/491 |
| 7,298,237 B2 * | 11/2007 | Stuve | 335/215 |
| 7,511,612 B1 * | 3/2009 | Monroe | 340/521 |
| 7,619,506 B2 | 11/2009 | Knoll et al. | |
| 7,672,756 B2 * | 3/2010 | Breed | 701/1 |
| 2005/0137786 A1 * | 6/2005 | Breed et al. | 701/200 |
| 2006/0047379 A1 * | 3/2006 | Schullian et al. | 701/19 |
| 2007/0152802 A1 | 7/2007 | Knoll et al. | |
| 2008/0224877 A1 | 9/2008 | Young | |
| 2009/0102653 A1 * | 4/2009 | McGinnis et al. | 340/551 |
| 2010/0207754 A1 * | 8/2010 | Shostak et al. | 340/450 |

FOREIGN PATENT DOCUMENTS

| | | |
|---|---|---|
| EP | 2210767 | 7/2010 |
| GB | 2318825 | 5/1998 |
| WO | 2007025136 | 1/2007 |

* cited by examiner

*Primary Examiner* — Carl Arbes
(74) *Attorney, Agent, or Firm* — Zarley Law Firm, P.L.C.

(57) ABSTRACT

A method of actuating a wireless sensor of road construction equipment. A bracket is secured to the road construction equipment that has a magnet and is able to receive a wireless sensor. An actuator is disposed within the housing of the wireless sensor that reacts to the magnetic field created by the magnet such that when the wireless sensor is attached to the bracket the sensor is operable and when detached from the bracket no longer operates.

9 Claims, 3 Drawing Sheets

METHOD OF ACTUATING A WIRELESS SENSOR OF ROAD CONSTRUCTION EQUIPMENT

BACKGROUND OF THE INVENTION

This invention relates to a method of actuating a wireless sensor. More specifically, this invention relates to a method of actuating a wireless sensor of road construction equipment that minimizes battery use.

In the road construction arts sensors are utilized in association with vehicles such as road pavers and the like to assist in the operation of the vehicles. For example, currently sensors are mounted on a vehicle and have a cable that connects the sensor to secondary sensors presented on a string line such that a master controller of the vehicle that is in communication with the sensor operates the steering and leveling of the vehicle to ensure that the vehicle is moving in a straight line.

Problems exist with utilizing such sensors because the cables are often subject to wear and potential damage by vehicle workers and the like. Thus, a need exists in the art to eliminate cables. Recently, Applicant has presented solutions in the form of wireless sensors associated with vehicles as can be seen in U.S. Ser. No. 13/298,105 which is incorporated herein and provides the use of wireless sensors in association with road construction vehicles.

While providing a system that utilizes wireless sensors improves upon the art problems still remain. Specifically, old wired sensors could be disconnected from the machine battery power when the sensors were disconnected at night or when the machine was shut down for the night terminating the machine battery connection; however, wireless sensors do not present the same functionality. Instead, wireless sensors are powered by internal batteries and thus a need exists for an efficient manner of powering on and off such devices. Because of the road construction setting simply placing a mechanical switch on the sensor is not a viable option. Specifically, as with the cable at road construction worksites, external mechanical switches would be bumped, hit, damaged and the like causing random power outages, adding cost for damaged equipment, and lost time in needed repairs. In addition, utilizing a microprocessor in a low current sleep mode that would be actuated by an electronically activated switch also is not desirable because the sleep mode continuously drain power from the battery minimizing the amount of time and effectiveness of the wireless sensor.

Thus, a principal object of the present invention is to provide a method of actuating a wireless sensor of road construction equipment that minimizes battery use.

Yet another object of the present invention is to provide a method of actuating a wireless sensor of road construction equipment that minimizes damages and cost associated with the sensor.

These and other objects, features, or advantages of the present invention will become apparent from the specification and claims.

BRIEF SUMMARY OF THE INVENTION

A method of actuating a wireless sensor of road construction equipment that includes providing a road construction machine and securing a bracket to the machine. A magnet is attached to the bracket in a spaced relation to an attachment section of the bracket that detachably receives a wireless sensor. The wireless sensor is then attached to the bracket such that as the wireless sensor is attached to the bracket the magnet of the bracket actuates an actuator of the wireless sensor in order to activate or turn on the wireless sensor.

DETAILED DESCRIPTION OF THE PREFERRED EMBODIMENT

Figure 1:
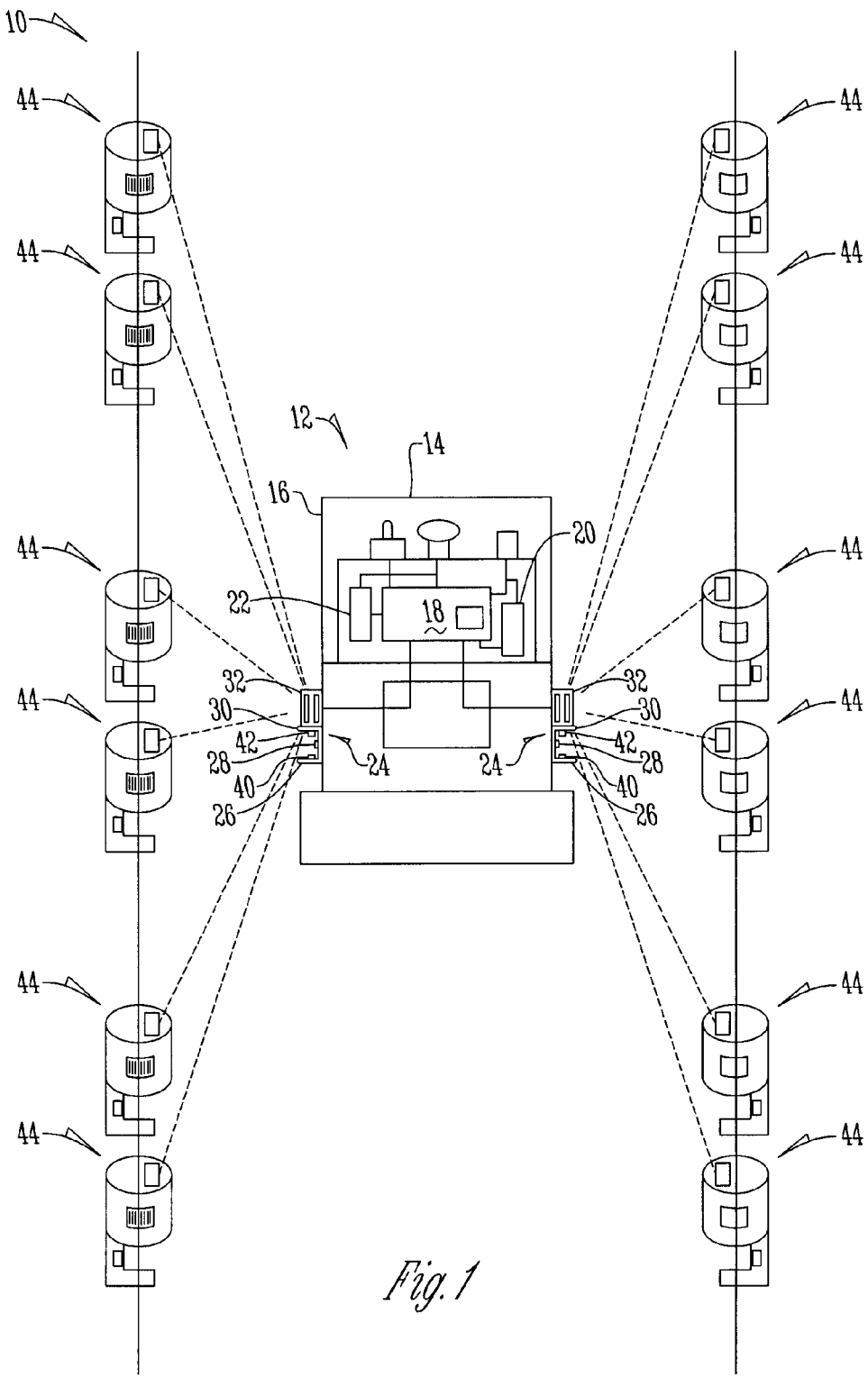
FIG. 1 is a schematic view of a sensor system.
Figure 2:
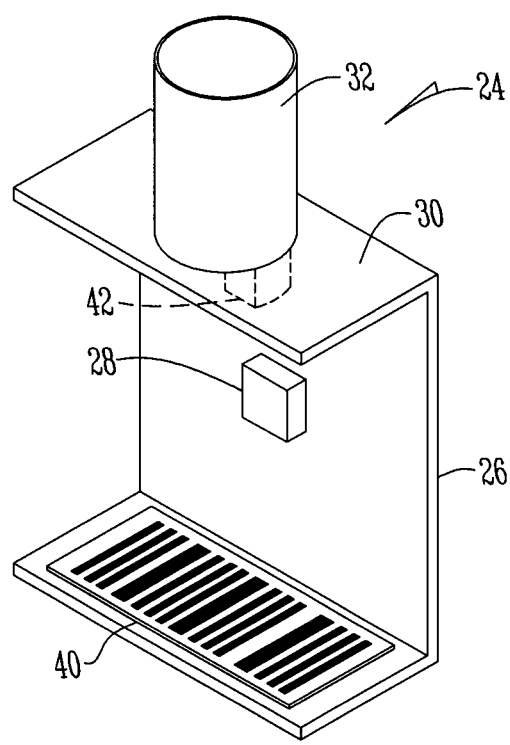
FIG. 2 is a side perspective view of a bracket assembly or a sensor system.
Figure 3:
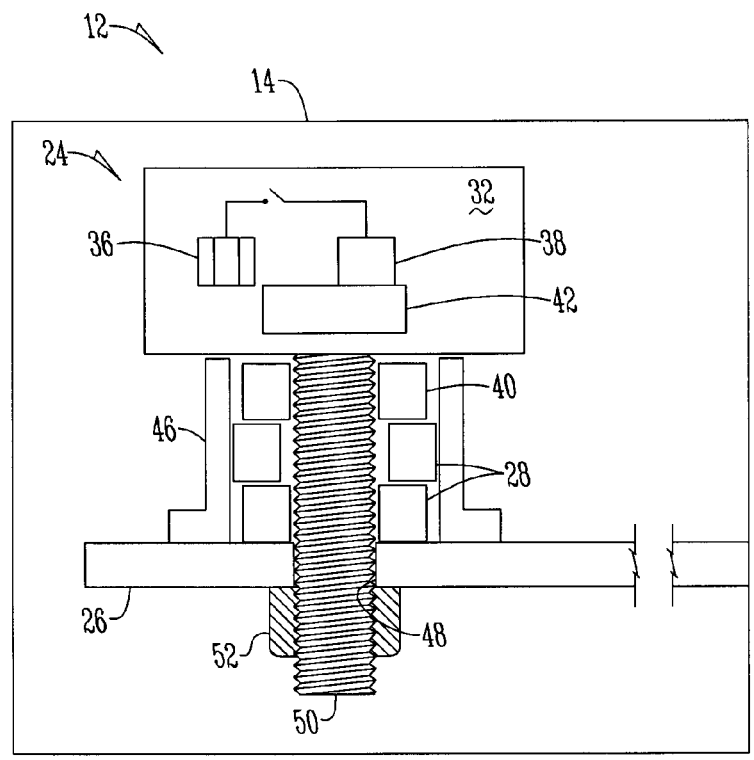
FIG. 3 is a partial side plan view of a bracket assembly secured to a road construction vehicle.
Figure 4:
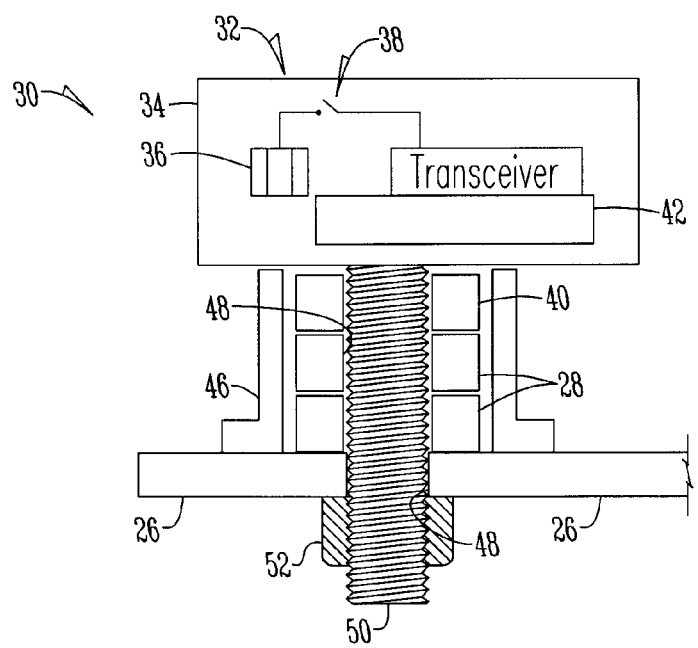
FIG. 4 is schematic view of a wireless sensor.

FIG. 1 shows a sensor system 10 for road construction equipment 12 that includes a road construction machine 14. In one embodiment the road construction machine is a vehicle such as a paver that has a frame 16 that houses a master control 18 that operates valving 20 and a steering device 22 in order to control the steering and elevation of the vehicle 14.

A bracket assembly 24 is secured to the road construction machine 14 by bolting or securing the bracket to the machine 14 in order to affix the bracket assembly 24 to the frame 16. The bracket assembly includes a bracket 26, a magnet 28 detachably secured to the bracket, an attachment section 30 that is in spaced relation to the magnet and is of size and shape to receive and fixedly hold in place a wireless sensor 32.

The bracket assembly 24 also includes a machine readable medium 40 affixed adjacent in spaced relation to the mounting section 28. The machine readable medium 40 in a preferred embodiment is a radio frequency identification (RFID) tag such as an ISO15693 tag. Alternatively, the machine readable medium 30 can be a barcode, barcode matrix, QR code, or the like that has embedded code therein that contains information and/or data in a machine readable format.

In an alternative embodiment, the attachment section 30 of the bracket 26 includes a mounting post 46 which houses the machine readable medium 40 and at least one magnet 28 such that the machine readable medium 40 and magnet 28 are permanently attached to the bracket 26. In one embodiment, the bracket 26, machine readable medium 40 and the at least one magnet 28 have a hole 48 disposed therethrough. Preferably, the at least one magnet 28 is mounted within the mounting post 46 collocated with the machine readable medium 40 exposed at the upper end of the mounting post 46.

The wireless sensor 32 has a housing 34 that encloses a plurality of batteries 36 that supply the power to operate the sensor 32. Additionally enclosed within the housing 34 is an actuator 38 that is in electric communication with the batteries 36 such that when the actuator 38 is activated the batteries supply power for the sensor 32. At this time the sensor is considered to be operational or on and when not activated the batteries 36 do not supply power for the wireless sensor 32 and the wireless sensor is not operational or turned off. In a preferred embodiment the actuator is a reed switch and more preferably an SPST 5V DC read relay that upon being introduced to magnetic flux created by the magnet 28 activates to turn on the wireless sensor 32.

The wireless sensor 32 is detachably secured by and held in place by the attachment section 28 of the bracket 26 and has a reading device 42 attached thereto and positioned on the wireless sensor 32 such that the reading device 42 is adjacent the machine readable medium 40 when the wireless sensor 32 is in the attachment section 28 of bracket 26. The wireless sensor 32 can be any typed of wireless sensor including a sonic sensor, laser sensor, or the like. The reading device 42 in a preferred embodiment is a radio frequency identification (RFID) reader that is able to scan and read information from the machine readable medium 40 regarding the location data embedded within the machine readable medium 40. Specifically, the reading device 42 is electrically connected to the master controller 18 in order to send an electronic signal in order to provide the data read from the machine readable medium 40 to the master controller 18.

In an alternative embodiment, the wireless sensor 32 includes a bolt 50 extending from the housing 34 of the wireless sensor 32. Preferably, the reading device 42 is mounted within housing of the wireless sensor 32 collocated with the actuator 38 such that the reading device 42 is adjacent to the bolt 50 such that the reading device 42 can read the machine readable medium 40 when the wireless sensor 32 is attached to the mounting post 46 of the bracket assembly 24.

A plurality of sensors 44 are placed in remote spaced relation from the wireless sensor 32. These sensors 44 provide signals that are received by the wireless sensor 32 and sent to the master controller 18 as indicated in U.S. Ser. No. 13/298,105.

In operation a road construction machine 14 is provided and a bracket 26 with an attached magnet 28 is secured to the machine 14. The attached magnet 28 is placed in spaced relation from the attachment section 30 of the bracket 26. A wireless sensor 32 is then attached to the attachment section 30 of the bracket 26 within the magnetic field of the magnet 28.

Alternatively, the wireless sensor 32 is attached to the bracket assembly 24 by inserting the mounting bolt 32 through the hole disposed through the machine readable medium 40, the one or more magnets 28, and the bracket 26. In this manner, the wireless sensor 32 slides onto the mounting post 46 of the bracket 26 on the same side of the bracket 26 where the machine readable medium 40 and one or more magnets 28 are attached until the bolt 50 protrudes through the opposite side of the bracket 26. A nut 52 is attached to the opposite side of the bracket 26 to lock the sensor 32 to the bracket 26 such that the reading device 42 within the housing of the sensor 32 is directly adjacent to the machine readable medium 40.

The magnetic field created by the magnet 28 effects or is sensed by wireless sensor 32. In response to the magnetic field created by the magnet 28 the actuator activates in order to turn on or cause the wireless sensor 32 to be operational to receive information from other sensors in order to operate the valving 20 and steering device 22 of the road construction machine 14.

When the wireless sensor 32 is mounted on the mounting bracket 26 and is operational via the one or more magnets 28 the reading device 42 scans and reads the machine readable medium 40 that provides location data to the reading device 42. The reading device 42 then sends an electronic signal to the master controller 18 providing this location information such that the master controller 18 recognizes the exact fixed location of the wireless sensor 32 being used in association with the machine 14 on that particular day. At this time the rest of the plurality of sensors 44 can be placed in their desired location to transmit information to the wireless sensor 32 on the machine 14. Once the day is complete the sensors are gathered and the process is repeated the next day.

The wireless sensor 32 remains operational while within the magnetic field of the magnet 28 until the sensor no longer needs to be used. At this time an individual removes the sensor 32 from the attachment section 30 removing the actuator 38 from the magnetic field of the magnet 28 thus causing the sensor 32 to no longer operate or draw power from the batteries 36.

Thus presented is a sensor system 10 and method of using the same that presents an internally housed actuator 38 that powers a wireless sensor 32 used in association with road construction equipment 12. By utilizing an internal switch the switch cannot be caught on or damaged by items or happenings within the road construction area. In addition, by presenting a wireless sensor that only actuates when placed on the bracket 26 and does not operate when removed from the bracket 26, the sensor does not have to utilize a microprocessor in order to place the sensor 32 in a standby mode where power from the batteries 36 continuously is drained to support this functionality. Thus, the life of the batteries 36 of the sensor 32 is increased providing an enhanced and improved sensor system 10. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:

1. A method of actuating a wireless sensor of road construction equipment steps comprising:
    providing a road construction machine;
    securing a bracket to the machine;
    attaching a magnet to the bracket in spaced relation to an attachment section of the bracket;
    attaching a wireless sensor to the attachment section of the bracket; and
    wherein the magnet actuates an actuator of the wireless sensor when the wireless sensor is attached to the bracket.

2. The method of claim 1 wherein the road machine is a road paver.

3. The method of claim 1 wherein the magnet is fixed to the bracket.

4. The method of claim 1 wherein the wireless sensor is a laser sensor.

5. The method of claim 1 wherein the wireless sensor is a sonic sensor.

6. The method of claim 1 wherein the wireless sensor has a housing that encloses a battery.

7. The method of claim 6 wherein the actuator of the wireless sensor is enclosed with the housing of the wireless sensor.

8. The method of claim 7 wherein the actuator is a reed switch in electric communication with the battery.

9. The method of claim 1 further comprising the step of removing the wireless sensor from the bracket to deactivate the wireless sensor.

\* \* \* \* \*